US008695745B2

(12) United States Patent
Gagnon et al.

(10) Patent No.: US 8,695,745 B2
(45) Date of Patent: Apr. 15, 2014

(54) SNOWMOBILE SUSPENSION LOAD ADJUSTING MECHANISM (75) Inventors: Pascal Gagnon, Valcourt (CA); Bertrand Mallette, Rock Forest (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 13/881,218

(22) PCT Filed: Oct. 29, 2010

(86) PCT No.: PCT/US2010/054721
§ 371 (c)(1),
(2), (4) Date: Apr. 24, 2013

(87) PCT Pub. No.: WO2012/057784
PCT Pub. Date: May 3, 2012

(65) Prior Publication Data
US 2013/0270020 A1    Oct. 17, 2013

(51) Int. Cl.
*B62M 29/00*    (2006.01)
(52) U.S. Cl.
USPC ......... 180/193; 180/182; 180/190; 180/9.25; 180/9.28; 180/184; 180/186
(58) Field of Classification Search
USPC ........ 180/193, 190, 182, 9.25, 9.28, 186, 184
See application file for complete search history.

(56) References Cited

U.S. PATENT DOCUMENTS

| 4,200,307 | A | 4/1980 | Szabo |
| 5,533,586 | A | 7/1996 | Thompson |
| 5,944,134 | A | 8/1999 | Peppel et al. |
| 6,206,124 | B1 | 3/2001 | Mallette et al. |
| 2001/0023787 | A1 | 9/2001 | Mallette |
| 2005/0016784 | A1 | 1/2005 | Fecteau |
| 2009/0050390 | A1 | 2/2009 | Mallette et al. |
| 2009/0078518 | A1 | 3/2009 | Gagnon et al. |
| 2010/0281858 | A1* | 11/2010 | Stansbury, III ................. 60/327 |
| 2012/0166043 | A1* | 6/2012 | Watson ........................... 701/37 |
| 2012/0247852 | A1* | 10/2012 | Fecteau et al. ................ 180/193 |

OTHER PUBLICATIONS

International Search Report from PCT/US2010/054721; Jan. 3, 2011; Lee W. Young.

* cited by examiner

*Primary Examiner* — Tashiana Adams
*Assistant Examiner* — Marlon Arce
(74) *Attorney, Agent, or Firm* — BCF LLP (57) ABSTRACT A snowmobile has a tunnel and a rear suspension assembly. The rear suspension assembly includes at least one rail for engagement with the endless drive track and at least one suspension arm. At least one torsion spring is coupled to the at least second suspension arm. The at least one torsion spring has a first end contacting the rail and a second end. A torsion spring adjuster is fixedly connected to the at least one suspension arm. The torsion spring adjuster receives the second end of the at least one torsion spring. An actuator is operatively connected to the torsion spring adjuster. The actuator is located at least partially outside the tunnel. The actuator operates the torsion spring adjuster to move the second end of the at least one torsion spring relative to the first end of the at least one torsion spring.

20 Claims, 10 Drawing Sheets

SNOWMOBILE SUSPENSION LOAD ADJUSTING MECHANISM

TECHNICAL FIELD

The present invention relates to load adjusting mechanisms of suspension assemblies for tracked vehicles, and more particularly to load adjusting mechanisms of rear suspension assemblies for snowmobiles.

BACKGROUND

Some snowmobile rear suspensions have been enhanced with adjustable features for adapting the rear suspension to individual needs of riders. Commonly, the snowmobile rear suspensions have adjustable shock absorbers which alter the compression and rebound damping of the shock absorbers of the snowmobile rear suspension. Additionally, snowmobile rear suspensions have adjustments which are linked to the amount of tension within the coil and torsion springs of the snowmobile rear suspension. Such adjustments are done manually by the user. By adjusting the load (or preload) of the (one or more) torsion springs, the user can change the suspension characteristics to meet his/her desired characteristics.

The torsion springs are used to expand the rear suspension after it has been compressed so that it is ready to absorb a subsequent impact. The torsion springs are disposed around a transverse rod of the rear suspension arm(s) of the rear suspension. The first end of each torsion spring is in contact with the slide rails and the second end is in contact with the rear suspension arm. The torsion springs apply a bias force to rotate the rear suspension arm with respect to the slide rails so as to raise the tunnel away from the ground. Sometimes, only one torsion spring is used.

In one system, the short end of the torsions springs, i.e. the second end in contact with the rear suspension arm, is received on a rotatable block. The block has one or more sides which are non-equally distanced from the rotation axis of the block, such that the preload of the torsion springs can be altered by rotating the block. The preload of the torsion springs is determined by the side of the block in contact with the second ends of the torsion springs. The rotation of the block is done manually using a tool such as a wrench, by applying a torque to the block so as to rotate it.

In order to rotate the block, the user may have to kneel on the ground and extend his/her arm under the tunnel into the rear suspension system when accessing the block. As can be easily understood, such position can be cumbersome to apply sufficient force to rotate the block. In some cases, the user can dirty his clothing if contact is made with some of the snowmobile rear suspension components while making the adjustment.

Therefore, there is a need for a mechanism to adjust the load (or preload) on a torsion spring of a rear suspension assembly that is easily accessible to for the user.

SUMMARY

It is an object of the present invention to ameliorate at least some of the inconveniences present in the prior art.

A snowmobile is provided which has a load adjuster for a rear suspension located at least partially on an outside of a tunnel of the snowmobile.

In one aspect, a snowmobile has a chassis including a tunnel. The tunnel has a longitudinal axis. An engine is disposed on the chassis. An endless drive track is disposed at least in part inside the tunnel and operatively connected to the engine for propulsion of the snowmobile. At least one ski is disposed on the frame via a front suspension. A straddle seat is disposed on the tunnel above the endless drive track. The straddle seat is disposed rearward of the engine. A rear suspension assembly is supporting and tensioning the endless drive track. The rear suspension assembly includes at least one rail for engagement with the endless drive track. At least one suspension arm has an upper end pivotally connected to the tunnel and a lower end pivotally connected to the at least one rail. At least one torsion spring is coupled to the at least one suspension arm via a transverse rod. The at least one torsion spring has a first end and a second end. The first end applies a force the at least one rail. A torsion spring adjuster is connected to the at least one suspension arm. The torsion spring adjuster receives the second end of the at least one torsion spring. An actuator is operatively connected to the torsion spring adjuster. The actuator is located at least partially outside the tunnel. The actuator operates the torsion spring adjuster to move the second end of the at least one torsion spring relative to the first end of the at least one torsion spring.

In a further aspect, the torsion spring adjuster is hydraulically operated by the actuator.

In an additional aspect, the actuator includes a first volume of hydraulic fluid. The torsion spring adjuster includes a second volume of the hydraulic fluid. The first volume is in fluid communication with the second volume.

In a further aspect, the actuator includes a controller. When the controller is in a first position, at least a portion of the first volume of hydraulic fluid is transferred to the second volume of hydraulic fluid. When the controller is in a second position, at least a portion of the second volume of hydraulic fluid is transferred to the first volume of hydraulic fluid.

In an additional aspect, when at least the portion of the first volume of hydraulic fluid is transferred to the second volume of hydraulic fluid, a load on the at least one torsion spring is increased. When at least the portion of the second volume of hydraulic fluid is transferred to the first volume of hydraulic fluid, the load on the at least one torsion spring is decreased.

In a further aspect, increasing the load on the at least one torsion spring is achieved by moving the second end of the at least one torsion spring away from the first end of the at least one torsion spring. Decreasing the load on the at least one torsion spring is achieved by moving the second end of the at least one torsion spring toward the first end of the at least one torsion spring.

In an additional aspect, the controller is a hand-actuable knob.

In a further aspect, the actuator includes a piston, and the controller is operatively connected to the piston for transferring at least the portion of the first volume of hydraulic fluid to and from the second volume of hydraulic fluid.

In an additional aspect, the controller is a hand-actuable knob, and the controller is operatively connected to the piston via a threaded rod.

In a further aspect, the torsion spring adjuster includes a fixed portion fixedly connected to the at least second suspension arm. The torsion spring adjuster includes a movable portion receiving the second end of the at least one torsion spring.

In an additional aspect, the movable portion is movable along a load adjusting axis relative to the fixed portion for adjusting a load on the at least one torsion spring.

In a further aspect, when the movable portion is moved upwardly along the load adjusting axis, the load on the at least one torsion spring is increased. When the movable portion is moved downwardly along the load adjusting axis, the load on the at least one torsion spring is decreased.

In an additional aspect, the actuator is in fluid communication with the torsion spring adjuster via a hose.

In a further aspect, the tunnel includes a foot rest. The actuator is located at least partially on the foot rest.

In a further aspect, the actuator is located at least partially on a rear part of the foot rest.

In an additional aspect, the at least one torsion spring is a first torsion spring. The snowmobile further comprises a second torsion spring disposed adjacent to the first torsion spring. The second torsion spring is coupled to the at least one suspension arm via the transverse rod. The second torsion spring has a first end contacting the at least one rail and a second end. The torsion spring adjuster is operated by the actuator to move the second ends of the first and second torsion springs relative to the respective first ends of the first and second torsion springs.

In a further aspect, a plate is fixedly connected to the at least one suspension arm. The plate has an aperture. A rim surrounds the aperture. An external surface of the torsion spring adjuster has a flange. The flange rests on the rim of the aperture to secure the torsion spring adjuster to the at least one suspension arm.

In an additional aspect, the second end of the at least one torsion spring biases the torsion spring adjuster toward the plate.

In a further aspect, the at least one suspension arm has a bend. The plate is fixedly connected to the at least one suspension arm near the bend.

In an additional aspect, the movable portion of the torsion spring adjuster has a rounded surface. The second end of the at least one torsion spring rests on the rounded surface.

For purposes of this application, terms related to spatial orientation such as forwardly, rearwardly, upwardly, downwardly, left, and right, are as they would normally be understood by a driver of the vehicle sitting thereon in a normal riding position.

Embodiments of the present invention each have at least one of the above-mentioned object and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
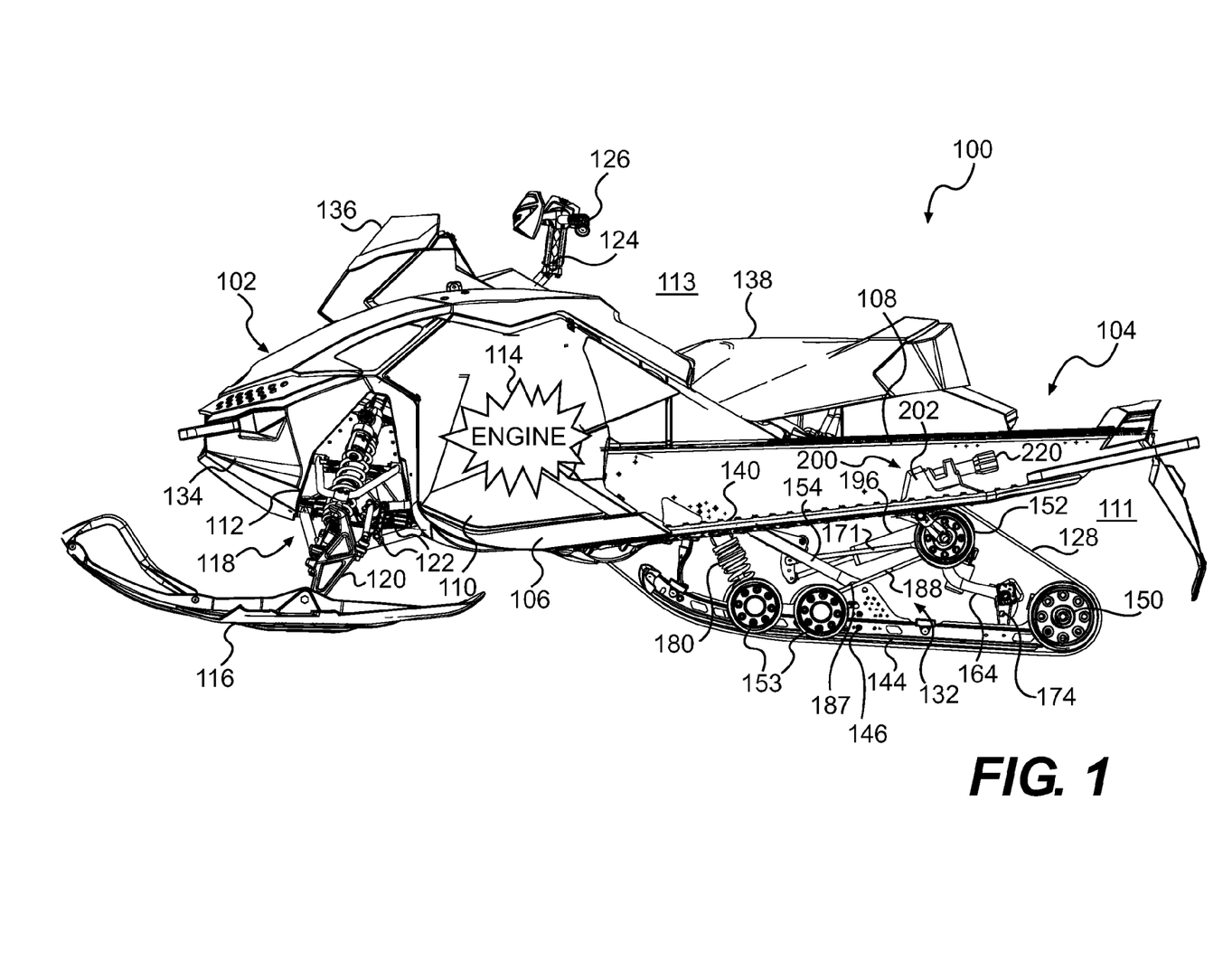
FIG. 1 is a left side elevational view of a snowmobile shown with a load adjusting mechanism.

Referring now to the drawings, and primarily to FIG. 1, a snowmobile is identified generally by the reference numeral 100.

The snowmobile 100 includes a front end 102 and a rear end 104, which are defined consistently with the forward travel direction of the vehicle. The snowmobile 100 includes a chassis 106 which includes a tunnel 108, an engine cradle portion 110 and a front suspension assembly portion 112.

Figure 2:
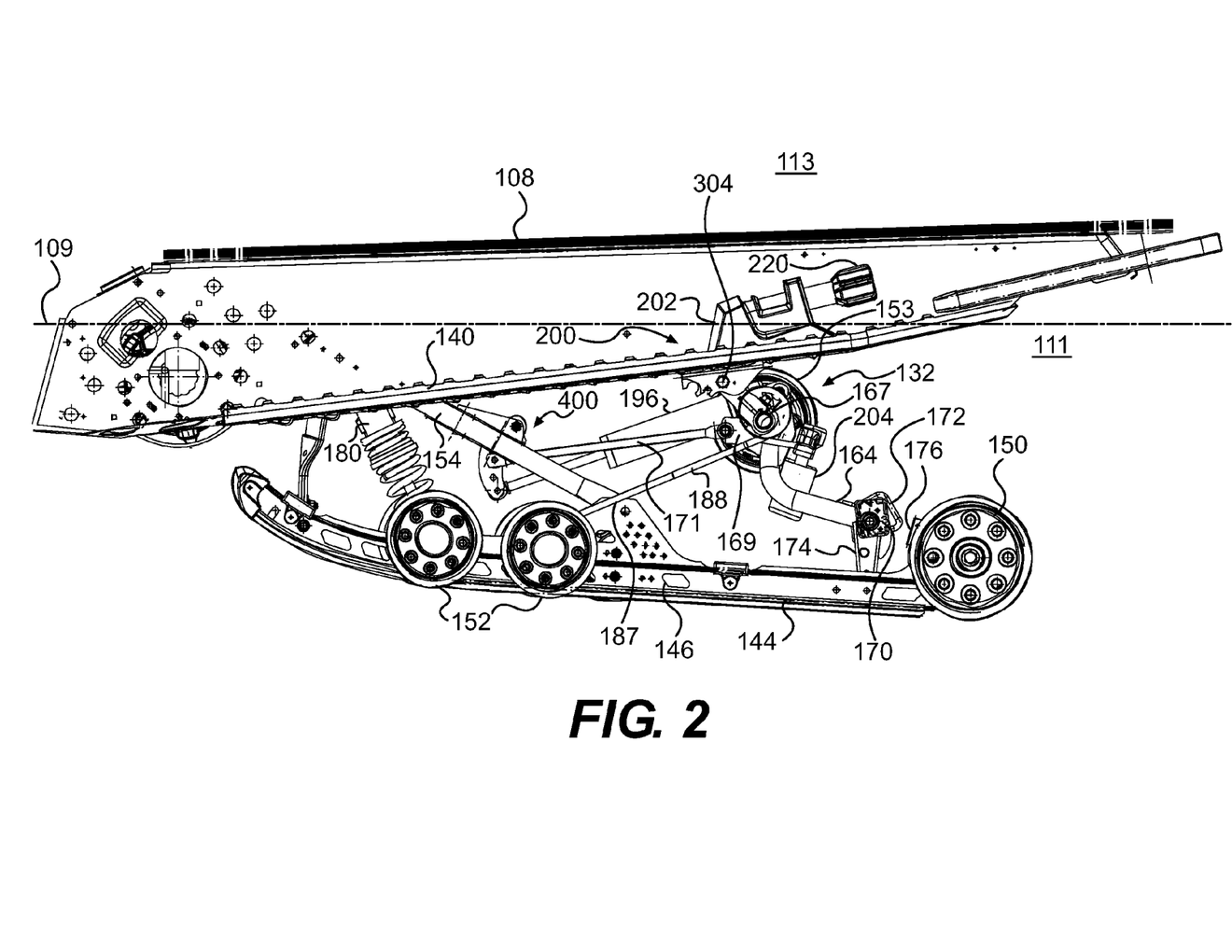
FIG. 2 is left side elevational view of a tunnel and a rear suspension assembly of the snowmobile of FIG. 1 with some elements removed for clarity.

The tunnel 108 has an elongated shape along a longitudinal axis 109 (shown in FIG. 2). The tunnel 108 is curved such that it forms a generally inverted U shape when seen from a front or a rear. An inside 111 of the tunnel 108 includes an area surrounded by and vertically below the U of the tunnel 108. An outside 113 of the tunnel 108 includes an area vertically above and besides the U of the tunnel 108.

An engine 114, which is schematically illustrated, is carried by the engine cradle portion 110 of the chassis 106. A ski and steering assembly is provided, in which two skis 116 (only one of which is shown) are positioned at the front end 102 of the snowmobile 100, and are attached to the front suspension assembly portion 112 of the chassis 106 through a front suspension assembly 118. The front suspension assembly 118 includes ski legs 120, supporting arms 122 and ball joints (not shown) for operatively joining the respective ski legs 120, supporting arms 122 and a steering column 124. The steering column 124 at its upper end is attached to a steering device such as a handlebar 126 which is positioned forward of a rider and behind the engine 114 to rotate the ski legs 120 and thus the skis 116, in order to steer the vehicle.

An endless drive track 128 is positioned at the rear end 104 of the snowmobile 100 and is disposed under the tunnel 108. The endless drive track 128 is operatively connected to the engine 114 through a belt transmission system (not shown). Thus, the endless drive track 128 is driven to run about a rear suspension assembly 132 for propulsion of the snowmobile 100. The rear suspension assembly 132 will be described in greater detail below.

At the front end 102 of the snowmobile 100, there are provided fairings 134 that enclose the engine 114 and the belt transmission system, thereby providing an external shell that not only protects the engine 114 and the belt transmission system, but can also be decorated to make the snowmobile 100 more aesthetically pleasing. Typically, the fairings 134 include a hood and one or more side panels which are all openable to allow access to the engine 114 and the belt transmission system when this is required, for example for inspection or maintenance of the engine 114 and/or the belt transmission system. A windshield 136 is connected to the fairings 134 near the front end 102 of the snowmobile 100, or may be attached directly to the handlebar 126. The windshield 136 acts as a windscreen to lessen the force of the air on the rider while the snowmobile 100 is moving.

A seat 138 extends from the rear end 104 of the snowmobile 100 to the fairings 134. A rear portion of the seat 138 may include a storage compartment, or may be used to accept a passenger seat. Two foot rests 140 (only one of which is shown in FIG. 1) are positioned on opposed sides of the snowmobile 100 below the seat 138 to accommodate the rider's feet. The foot rests 140 are integrally formed with the tunnel 108. It is contemplated that the foot rests 140 could be separate of the tunnel 108.

The endless drive track 128 is engaged with and driven by a drive sprocket (not shown) which is journaled by the tunnel 108 and is driven by the engine 114 through the belt transmission system. The endless drive track 128 is suspended for movement relative to the chassis 106, by the rear suspension assembly 132.

The rear suspension assembly 132 includes a slide frame assembly 144 which primarily includes a pair of spaced apart slide rails 146 that engage the inner side of the ground-engaging portion of the endless drive track 128. The slide frame assembly 144 journals a plurality of idler rollers 153 and 150. In addition, further idler rollers 152 are carried by the tunnel 108, in order to define the path over which the endless drive track 128 travels. The rear suspension assembly 132 will be described in greater details below.

An actuator 202 of a load adjusting mechanism 200 is disposed on a rear portion of the left foot rest 140. The load adjusting mechanism 200 is used to adjust a load (or preload) of torsion springs 188 of the rear suspension assembly 132. The load adjusting mechanism 200 will be described in greater details below.

Figure 3A:
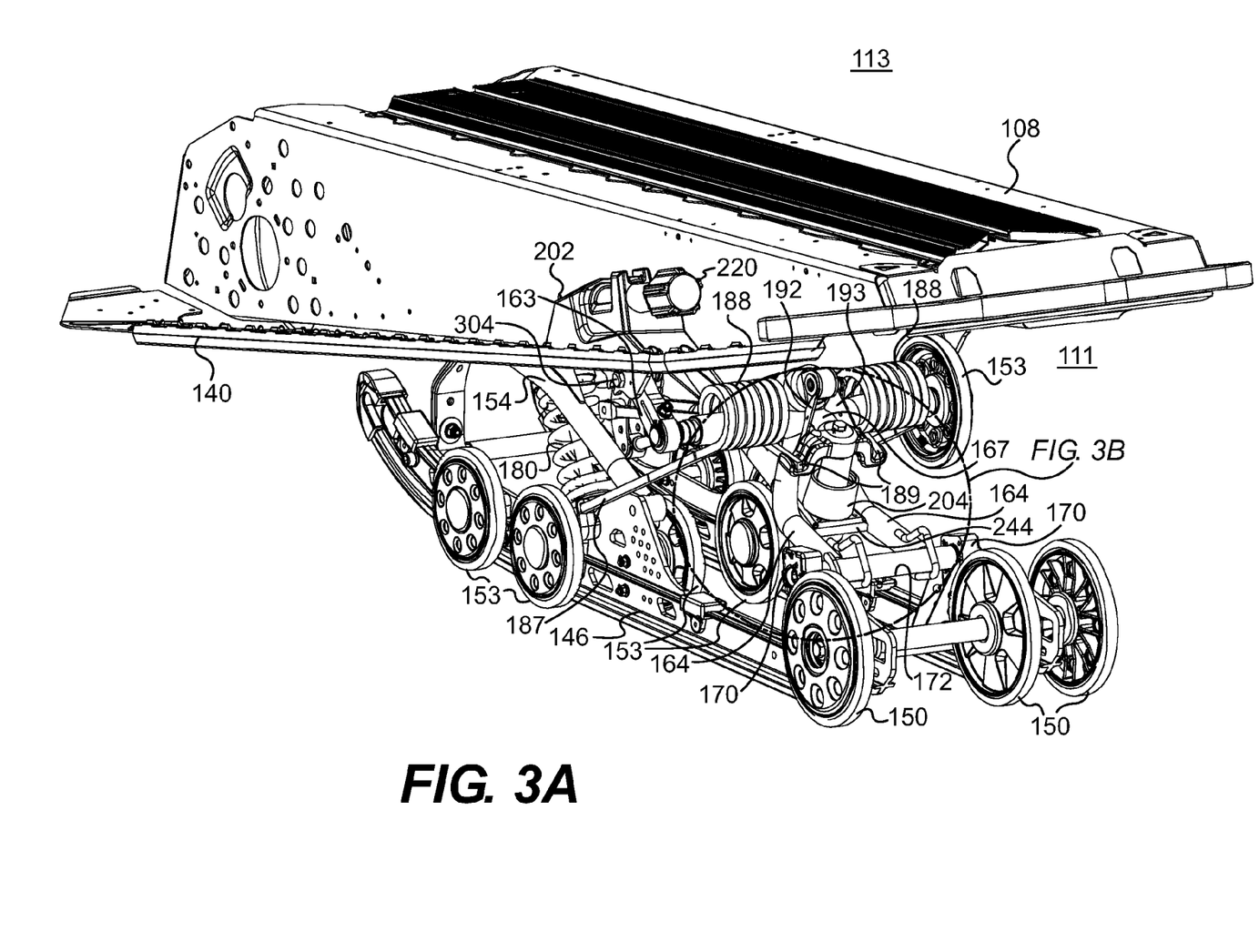
FIG. 3A is a perspective view taken from a rear, left side of the suspension assembly of FIG. 2.

Referring to FIGS. 2 and 3A, the rear suspension assembly 132 will now be described in greater details. The rear suspension 132 described herein is only one example of rear suspension 132 for the snowmobile 100.

The rear suspension assembly 132 comprises a front suspension arm 154 and a rear suspension arm 164. It is contemplated that the rear suspension assembly 132 could comprise only one suspension arm.

The front suspension arm 154 extends downwardly and rearwardly from a front portion of the tunnel 108. Upper ends of the front suspension arm 154 are pivotally attached to the tunnel 108 to form a pivot axis (not shown) that is perpendicular to a longitudinal axis (not shown) of the tunnel 108. The lower ends of the front suspension arm 154 are each pivotally attached to their respective slide rails 146 of the slide frame assembly 144 by a pivot pin assembly (not shown). The movement of the front portion of the slide rails 146 relative to the tunnel 108 of the chassis 106 causes the front suspension arm 154 to rotate about an axis defined by the pivot points 302, relative to the tunnel 108. The front suspension arms 154 are made of metal tubes having a generally circular cross-section. It is contemplated that the front suspension arm 154 could have other cross-sections, and that the front suspension arm 154 could be of another material than metal.

The rear suspension arm 164 extend downwardly and rearwardly from a rear portion of the tunnel 108, and are disposed rearward of the front suspension arm 154. The rear suspension arm 164 is made of metal tubes having a generally circular cross-section. It is contemplated that the rear suspension arm 164 could have other cross-sections, and that the rear suspension arm 164 could be of another material than metal. The rear suspension arm 164 is curved, have a bend, and form a generally L shape as seen from a side of the snowmobile 100. It is contemplated that the rear suspension arm 164 could be straight and has a shape other than a L shape. As will be apparent below, the L shape of the rear suspension arm 164 permits a torsion spring adjuster 204 to be accommodated along the rear suspension arm 164.

The rear suspension arm 164 is pivotally attached to the tunnel 108 of the chassis 106 at pivot points 304. Left and right intermediate links 163 are splined to upper ends of the rear suspension arm 164 and pivotally connected to the tunnel 108 at pivot points 304. Lower ends of the rear suspension arm 164 are fixedly connected to a hollow cross bar 172. The hollow cross bar 172 is pivotally connected to left and right rocker arms 174. It is contemplated that each of rear rocker arms 174 could be omitted and that rear suspension arm 164 could be pivotally connected directly to the corresponding slide rail 146. Each of the left and right rear rocker arms 174 is pivotally attached at its lower end to a rear portion of each slide rail 146.

Left and right rear blocks 170 are attached to the opposite ends of the hollow cross bar 172. Left and right rear stoppers 176 are attached to their corresponding slide rails 146 at a position rearward of their corresponding left and right rear rocker arms 174 in order to limit the pivot movement of the corresponding left and right rear rocker arms 174 in a clockwise direction. Each of the left and right rear stoppers 176 is mounted to a vertically extending portion of the slide frame assembly 144. The left and right blocks 170 are preferably made of elastomer, such as rubber, polyurethane resin, delrin or nylon. The left and right blocks 170 could alternatively be made of aluminum. In order to attenuate the impact loads generated when the left and right rear blocks 170 collide with the corresponding left and right rear stoppers 176, the rear stoppers 176 can be made of or coated with a resilient material such as rubber or a polymer. Such a resilient material used on the rear stoppers 176 also helps to reduce wear of the rear blocks 170. It is contemplated that the rear suspension assembly 132 could comprise left and right front stoppers disposed forwardly from each of the left and right rear rockers 174 to limit the pivot movement of the rear rocker arms 174 in a counterclockwise direction.

The rear suspension arm 164 are coupled to the front suspension arm 154 such that a motion of the rear portion of the slide rail assembly 144 can induce a related motion of the front portion slide rail assembly 144. Coupling is ensured by connecting a rear shock absorber 196 between the front suspension arm 154 and the rear suspension arm 164, as it will be described in greater details below. It is contemplated that the coupling could be ensured differently.

A front shock absorber assembly 180 disposed between the front suspension arm 154 and the slide frame assembly 144 extends rearwardly and downwardly from the front portion of the front suspension arm 154. A lower end of the front shock absorber assembly 180 is disposed forwardly of the lower ends of the front suspension arm 154. The front shock absorber assembly 180 is a damping unit which usually includes a hydraulic damper and a coil spring for absorbing the impact energy when impact forces are applied to the opposite ends of the damping unit. The coil spring biases the damping unit toward an extended position so that the hydraulic damper is in the best position to absorb the impact energies. Shock absorber assemblies of the type of the shock absorber assembly 180 are well known in the art and will not be further described herein.

The rear shock absorber 196 extends forwardly and downwardly from the rear suspension arm 164, and is disposed at least in part rearwardly of the front suspension arm 154. The rear shock absorber 196, similar to the hydraulic damper of front shock absorber assembly 180, is well known in the art, and therefore will not be described in detail. The rear shock absorber 196 is pivotally connected at its upper end to brackets 192, 193 to the rear suspension arm 164. The rear shock absorber 196 is connected at a lower end to the front suspension arms 154 via a pivot connection to left and right bracket arms and links 400.

Left and right tie rods 171 (only the left one being shown) are disposed on each side of the rear shock absorber 196. A lower end of each of the left and right tie rods 171 is pivotally connected to a corresponding one of the left and right links 400. An upper end of each of the left and right tie rods 171 is pivotally connected to a bracket 169 fixed to rear suspension arm 164.

Upon motion of the rear suspension arm 164, the rear shock absorber 196 gets actuated thereby moving the left and right tie rods 171. The shock absorber 196, the tie rods 171 and the links 400 form an assembly through which the pivot movement of the rear suspension arm 164 about pivot point 304 and relative to the tunnel 108 of the chassis 106 forces the left and right bracket arms 400 to act on the front suspension arms 154, thereby applying a force to the front portion of the tunnel 108, and actuating the front shock absorber assembly 180.

Left and right torsion springs 188 (only the left one being shown in FIG. 1, both being shown in FIG. 3A) are provided in order to push the slide frame assembly 144 apart from the tunnel 108 of the chassis 106, and to maintain the front and rear shock absorber assemblies 180, 196 substantially in an extended condition when no substantial loads are applied thereon. The left and right torsion springs 188 surround the transverse shaft 167 and are positioned at each end thereof. A first end 187 of each torsion spring 188 abuts the slide frame assembly 144 and applies a force thereto. It is contemplated that the first end 187 could abut the front suspension arm 154 and apply a force to the slide frame assembly 144. A second end 189 of each torsion spring 188 abuts a torsion spring adjuster 204. It is contemplated that the snowmobile 100 could have only one torsion spring 188.

Turning now to FIGS. 3B to 6, the load adjusting mechanism 200 will now be described.

As mentioned above, the load adjusting mechanism 200 comprises the torsion spring adjuster 204 and the actuator 202, which are disposed remotely from each other.

The actuator 202 is located on a rear portion of the left foot rest 140, which is a location easily accessible to the user. It is contemplated that the actuator 202 could be disposed elsewhere on the outside 113 of the tunnel 108. For example, the actuator 202 could be located on a different part of the left foot rest 140, or on the right foot rest 140, or elsewhere else on or above an upper surface of the tunnel 108. It is also contemplated that only a portion of the actuator 202 could be located on the foot rests 140 or elsewhere on the outside 113 of the tunnel 108. As will be described below, the actuator 202 includes a hydraulic mechanism for actuating the torsion spring adjuster 204. It is contemplated that the hydraulic mechanism could be remote from the actuator 202. For example, the hydraulic mechanism could be located on the inside 111 of the tunnel 108 while the actuator 202 could be located on the outside 113 of the tunnel 108. It is also contemplated that the hydraulic mechanism could be part of the torsion spring adjuster 204 itself, while the actuator 202 could be a switch. Examples of switches include a button on the handlebar 126 or a pedal, disposed remotely from the hydraulic actuator. It is contemplated that the actuator 202 could be a pump activated by an electric motor or a solenoid. The motor could be actuated by a switch as described above.

Figure 3B:
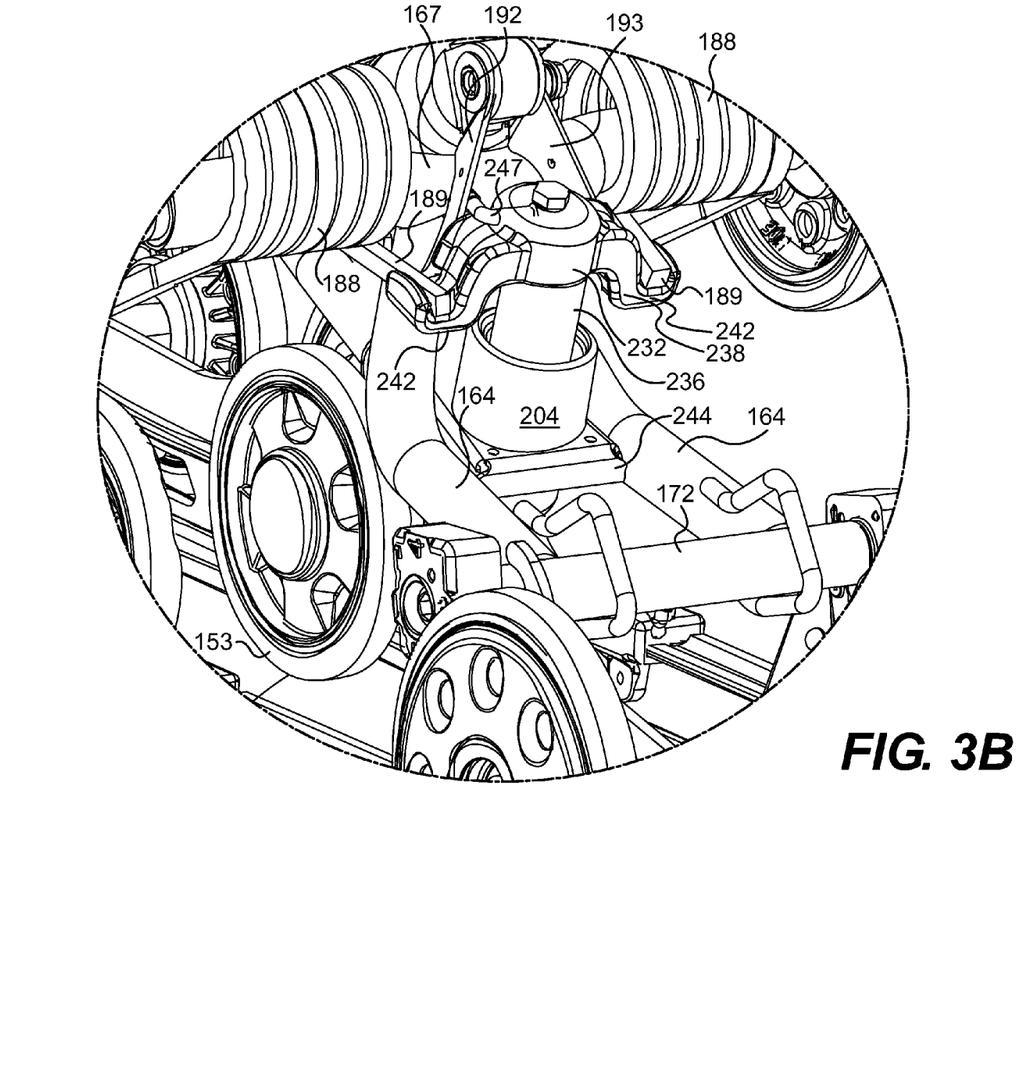
FIG. 3B is an closed-up view of a rear of the suspension assembly of FIG. 3A.

As best seen in FIG. 3B, the torsion spring adjuster 204 is disposed in between and is connected to the rear suspension arm 164, about the bend of the L shape of the rear suspension arm 164. It is contemplated that the torsion spring adjuster 204 could be located somewhere else on the rear suspension arm 164. It is also contemplated that the torsion spring adjuster 204 could be located elsewhere on the rear suspension assembly 132. A connection of the torsion spring adjuster 204 to the rear suspension arm 164 will be described in greater detail below.

Figure 4:
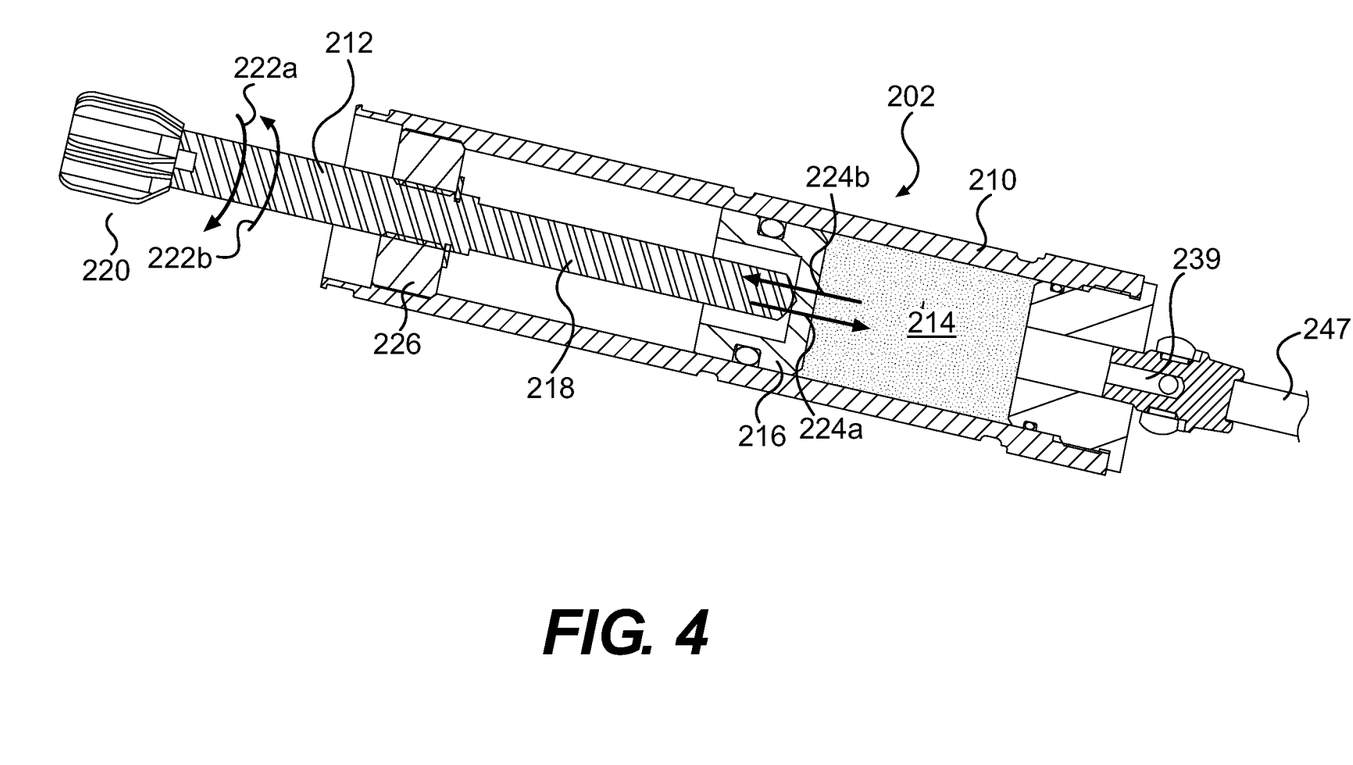
FIG. 4 is a cross-sectional view of an actuator of the load adjusting mechanism for the rear suspension assembly of FIG. 2.

Referring to FIG. 4, the actuator 202 comprises a fixed portion 210, and a movable portion 212. The movable portion 212 includes a piston 216 mounted to one end of a threaded shaft 218. A first volume 214 of hydraulic fluid (shown in shading) is defined by inner walls of the fixed portion 210 and the piston 216. Another end of the threaded shaft 218 has a hand-actuable knob 220 fixedly attached thereto. As indicated by arrows 222a and 222b, the user can turn the knob 220 in two directions. When the user turns the knob 220 in any one of the directions 222a, 222b, the threaded shaft 218 transform this rotational motion into a translational motion (illustrated by arrows 224a, 224b respectively) via a threaded end cap 226. The translational motion increases or decreases the first volume 214 of hydraulic fluid due to the displacement of the piston 216. An exit 239 in the fixed portion 210 disposed opposite to the piston 216 allows the hydraulic fluid to enter or exit the actuator 202. It is contemplated that the exit 239 could be disposed on sides of the fixed portion 210. It is also contemplated that the knob 220 could be replaced by a hand actuated lever or dial or by one or more finger actuated buttons or one or more pedals. It is also contemplated that the knob 220 and/or the actuator 202 could be replaced by an automatic command of the torsion spring adjuster 204.

Figure 5A:
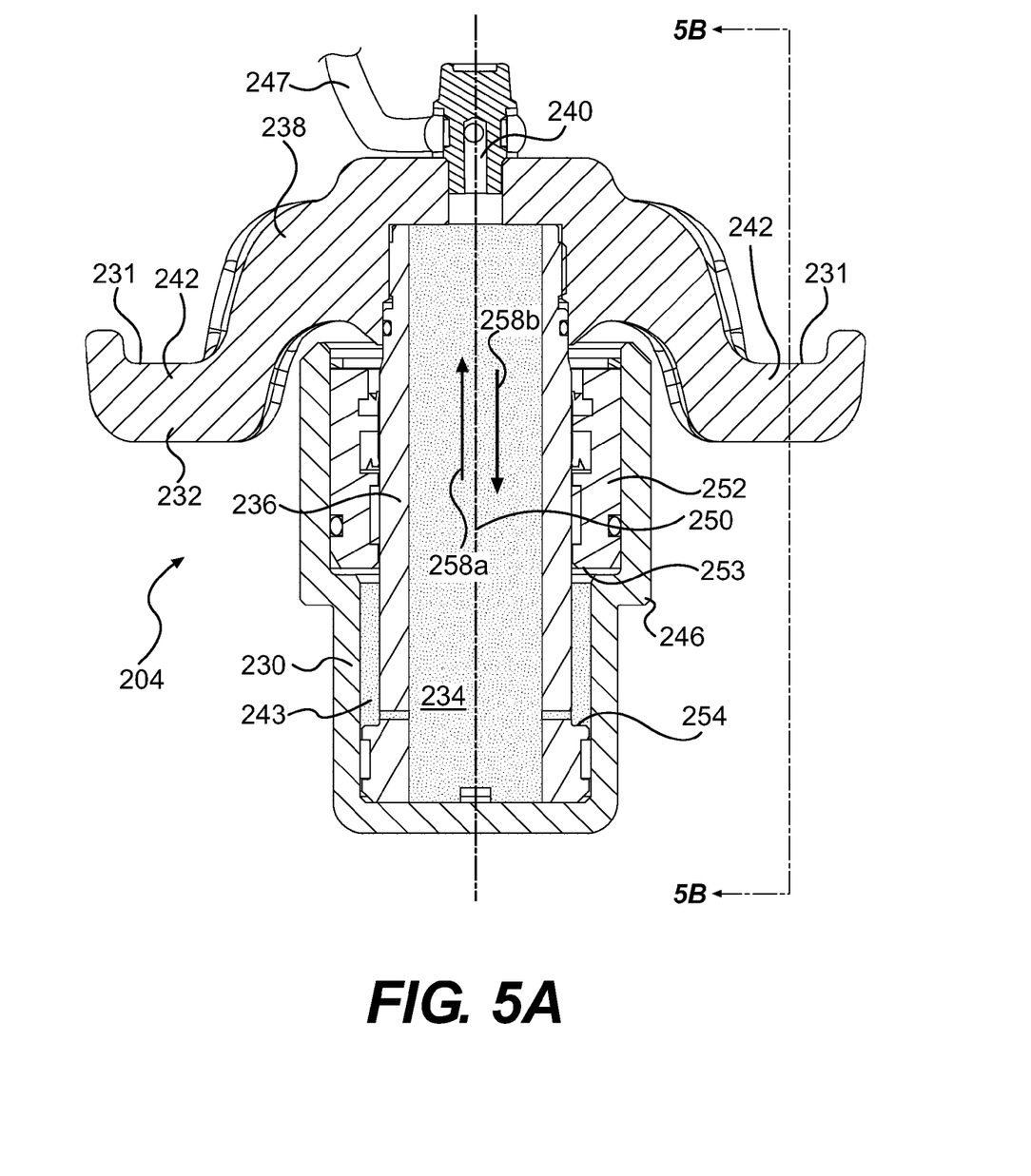
FIG. 5A is a cross-sectional view of a torsion spring adjuster of the load adjusting mechanism for the rear suspension assembly of FIG. 2.
Figure 5B:
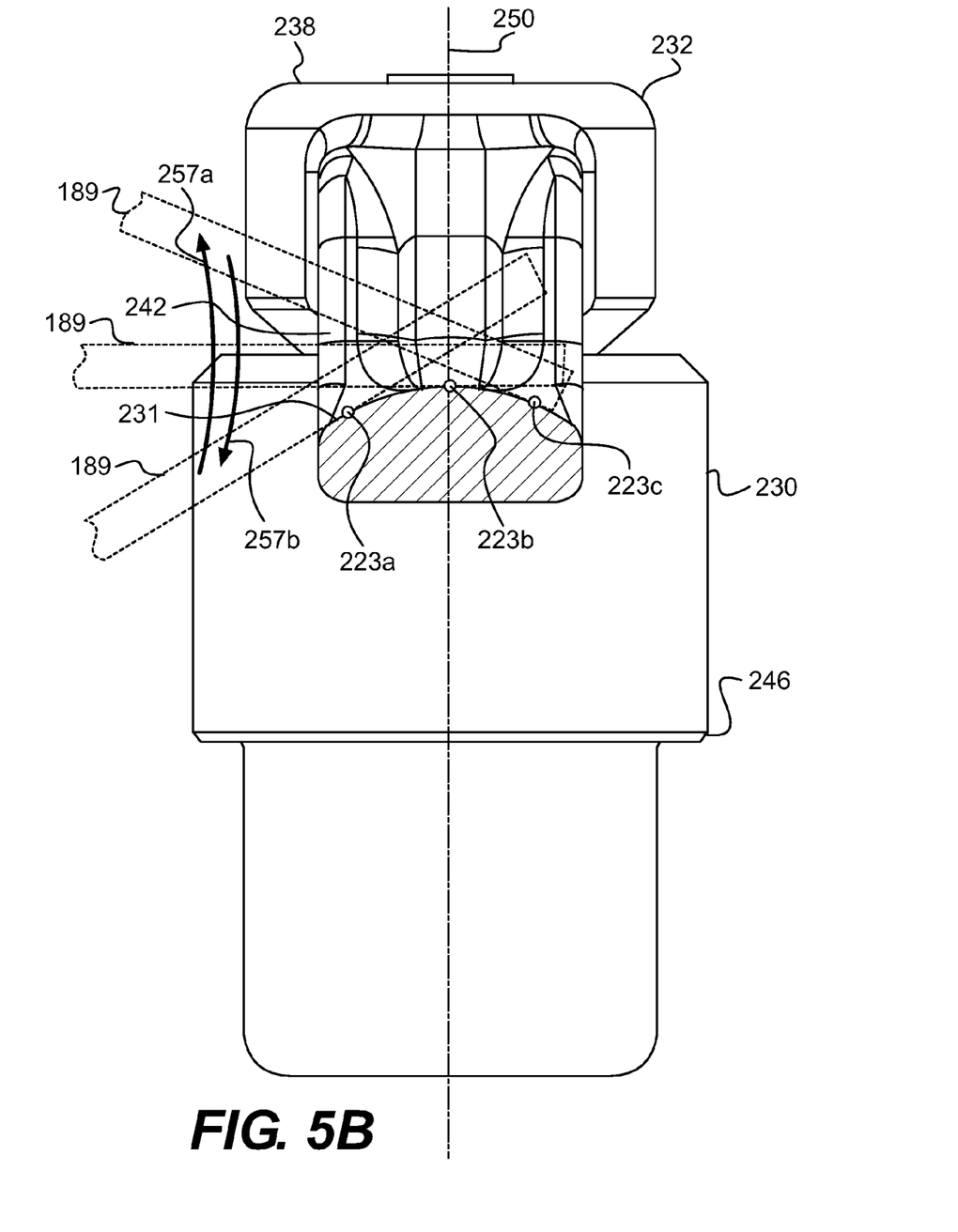
FIG. 5B is a cross-sectional view of a torsion spring adjuster taken along line 5B-5B in FIG. 5A, shown with an end of a torsion spring in dotted lines.

Referring to FIGS. 5A and 5B, the torsion spring adjuster 204 comprises a fixed portion 230 and a movable portion 232. The fixed portion 230 has a general hollow cylindrical shape. The movable portion 232 comprises a cylindrical tube 236 nested within the cylindrical fixed portion 230 and a cap 238 fixed to a top of the cylindrical tube 236. The second volume 234 of hydraulic fluid is defined by inner walls of the fixed portion 230 and a portion of the cap 238. The hydraulic fluid forming the second volume 234 enters and exits the torsion spring actuator 204 via the exit 240 located in the cap 238. The exit 240 is in fluid communication with the first volume 214 of hydraulic fluid via a hose 247. Thus, as will be described below, hydraulic fluid, under rotation of the knob 220, can be transferred from and to the first volume 214 of hydraulic fluid to and from the second volume 234 of hydraulic fluid. The second volume 234 is larger than the first volume 214. It is contemplated that the first volume 214 could be larger than the second volume 234 or both volumes could be equal. An outer wall of the cylindrical tube 236 has a flange 254 extending outwardly therefrom. When the cylindrical tube 236 is displaced upwardly over a certain distance, the flange 254 abuts against a stopper 252. The stopper 252 is in contact with an upper portion of inner walls of the fixed potion 230 so as to prevent the movable portion 232 to slide away from the fixed portion 230. The stopper 252 abuts against a flange 253 extending inwardly from an inner wall of the fixed portion 230. It is also contemplated that more than one stopper 252 could be used along a circumference of the inner walls of the fixed portion 230. Oil 243 is disposed between the outer wall of the cylindrical tube 236, the inner wall the fixed portion 230, the stopper 253 and the flange 254, for lubrication purposes. It is contemplated that the oil 243 could be omitted from this location.

The cap 238 comprises left and right retaining flanges 242. Each retaining flange 242 receives a corresponding one of the second ends 189 of the left and right torsion springs 188. Thus, as it can be understood, variation of the second volume 234 displaces the movable portion 232 in the directions of the arrows 258a, 258b which in turn displaces, along a load adjusting axis 250, the second ends 189 of the left and right torsion springs 188 relative to the first ends 187 of the left and right torsion springs 188.

Figure 7A:
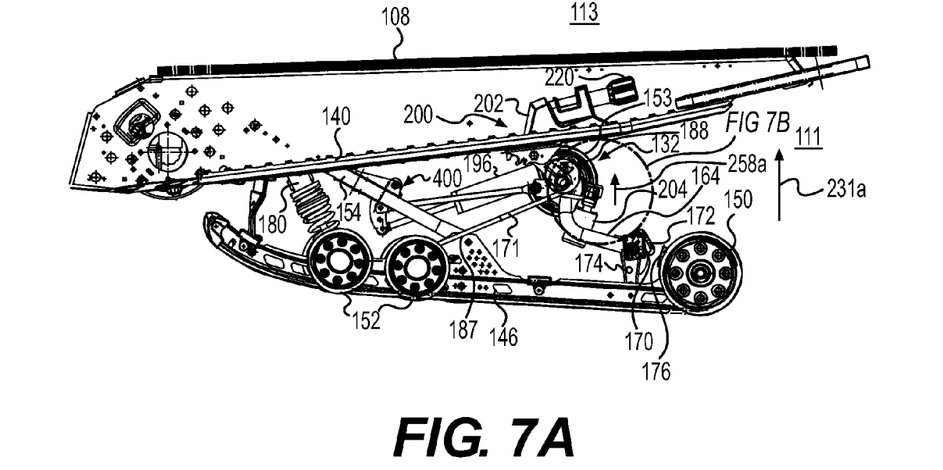
FIG. 7A is a left side elevational view of the tunnel and rear suspension assembly of FIG. 2 under a first load of the torsion spring.
Figure 7B:
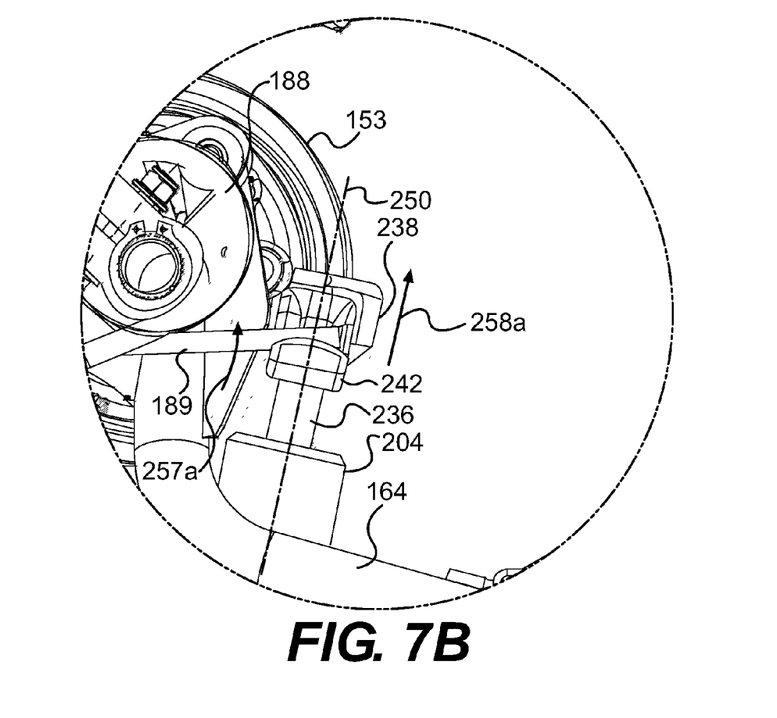
FIG. 7B is a close-up view of the torsion spring adjuster of FIG. 7A.
Figure 8A:
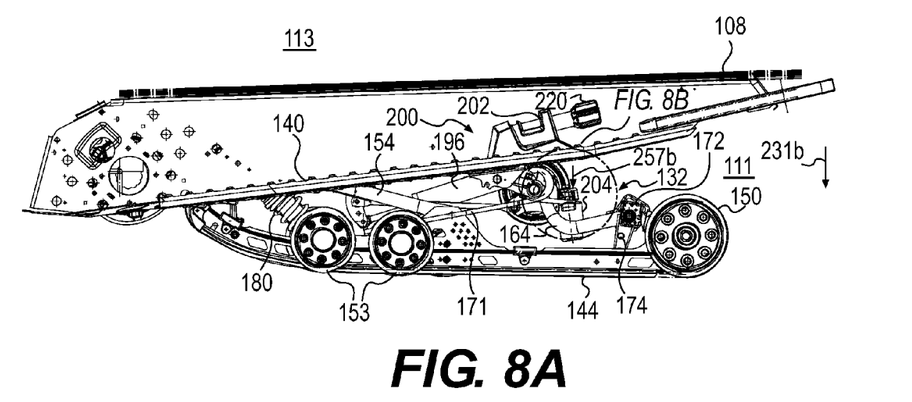
FIG. 8A is a left side elevational view of the tunnel and rear suspension assembly of FIG. 2 under a second load, smaller than the first load of the torsion spring.
Figure 8B:
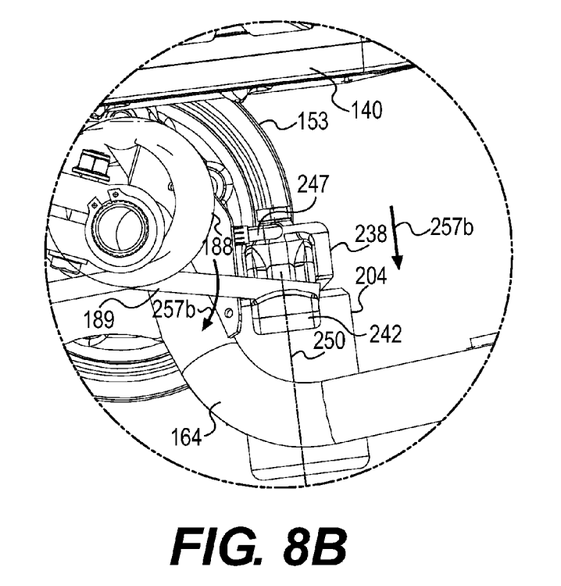
FIG. 8B is a close-up view of the torsion spring adjuster of FIG. 8A.

As best seen in FIG. 5B, the retaining flanges 242 have surfaces 231 that are rounded and convex. The surfaces 231 are rounded to ease sliding of the second end 189 on the movable portion 232. The rounded surfaces 231 also help to reduce moments that could be created from the pressure of the torsion springs 188. The second end 189 of one of the torsion spring 188 is shown in FIG. 5B in dotted lines for different positions. These positions result from different positions of the movable portion 232 along the load adjusting axis 250. For simplicity, the movable portion 232 is shown in one position and the different positions of the second end 189 are shown superimposed, although to achieve these positions of the second end 189, the position of the movable portion 232 along the load adjusting axis 250 would need to be different than the one shown in FIG. 5B. It can be noticed that a roundness of the surface 231 creates a contact surface 223a (or 223b, or 223c depending on the position of the movable portion 232, only contact point of the contact surfaces 223a, b,c being shown in FIG. 5B) between the movable portion 232 and the second end 189 of the torsion spring 188. Because the surface 231 is rounded, the contact surface 223a (or b or c) moves along the surface 231 when the movable portion 232 moves along the load adjusting axis 250. Having a smooth displacement of the contact surface 223a (or b or c) along the surface 231 reduces possible unwanted moment (or twist) of the movable portion 232. It is contemplated that the second end 189 could slide on the surface 231 as the movable portion 232 is moved upwards or downwards (shown by directions 257a,b in FIGS. 7B, 8B). It is also contemplated that the surfaces 231 could be flat. It is contemplated that only one retaining flange 242 could be used. It is also contemplated that a connection between the second ends 189 and the cap 238 could be done without the retaining flanges 242.

Figure 6:
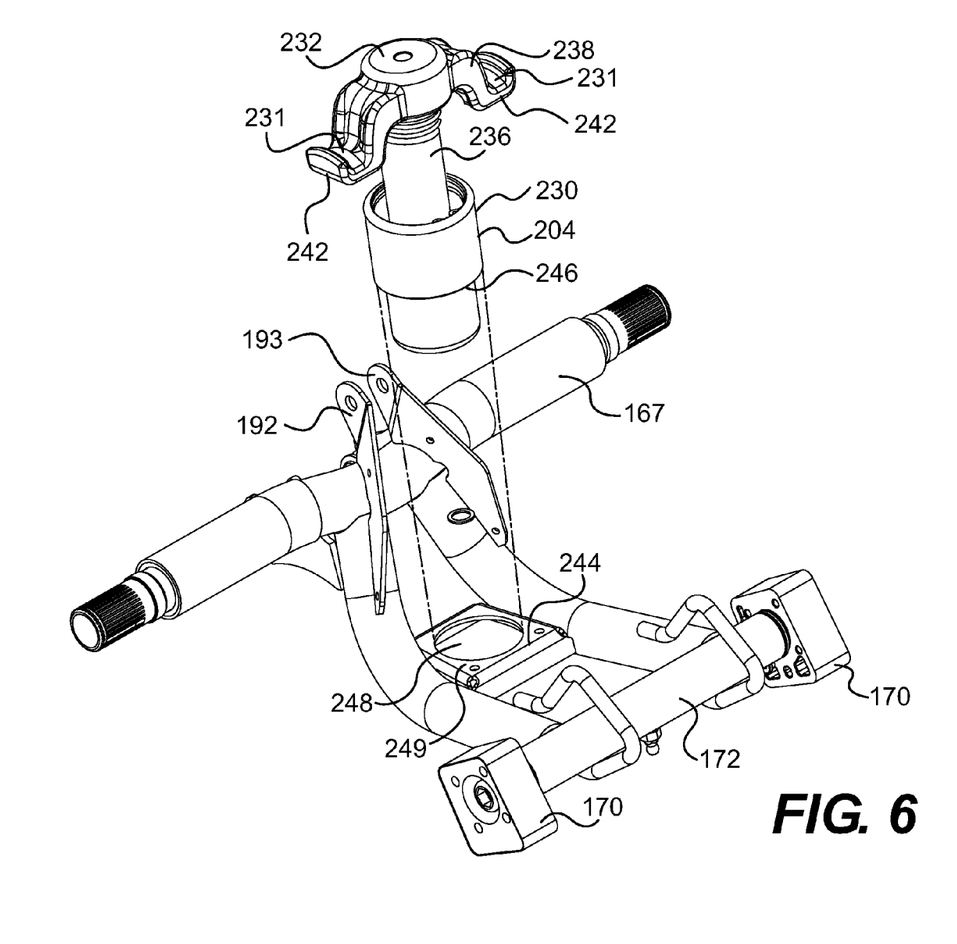
FIG. 6 is a perspective view taken from a rear, left side of the torsion spring adjuster mounted to the rear suspension assembly of FIG. 2.

The connection of the torsion spring adjuster 204 to the rear suspension arm 164 will now be described. As best seen in FIG. 6, a flange 246 extending outwardly from an outer wall of the cylindrical fixed portion 230 abuts against a rim 249 of an aperture 248 in a plate 244. The plate 244 is welded to the rear suspension arm 164 near the bend of the rear suspension arm 164. A length of the second ends 189 of the torsion springs 188 can be short by using this location. The plate 244 is oriented so that the torsion spring adjuster 204 is oriented as perpendicular as possible to the second end 189 of the torsion spring 188. A force created by the second ends 189 of the torsion springs 188 on the torsion spring adjuster 204 biases the torsion spring adjuster 204 toward the plate 244 so as to hold it there. It is contemplated that the torsion spring adjuster 204 could be welded to the plate 244. It is also contemplated that the plate 244 could be integrally formed with the torsion spring adjuster 204. It is also contemplated that the plate 244 could be omitted. It is also contemplated that the aperture 248 could not be circular. For example, the aperture 248 could be squared or the rim 249 could not be continuous. It is contemplated that the flange 246 could also not be circular. It is also contemplated that only a portion of the flange 246 could abut against the rim 249. It is also contemplated that more than one flange 249 could be used.

Turning now to FIGS. 7A to 8B, a principle of operation of the load adjusting mechanism 200 will be described.

When the user desires to increase the load (or preload) on the torsion springs 188, the user turns the knob 220 in the direction 222a so as to push the piston 216 in the direction 224a. By pushing the piston 216 toward the exit 239 (i.e. in the direction 224a), the first volume 214 is decreased, and a portion of the first volume 214 of hydraulic fluid is transferred via the hose 247 to the second volume 234 of hydraulic fluid. The second volume 234 of hydraulic fluid is increased upon addition of the portion of the first volume 214 of hydraulic fluid. This addition of hydraulic fluid causes the cylindrical tube 236 to move within the cylindrical fixed portion 230. The cylindrical tube 236 (and the cap 238) moves upwardly along the load adjusting axis 250 in the direction 258a. By doing so, the second ends 189 of the torsion springs 188 are moved away from the first ends 187 of the torsion springs 188 (illustrated by the arrow 257a in FIGS. 7A and 7B), which in turn increases the load (or preload) on the torsion springs 188 and moves the tunnel 108 upwardly (illustrated by arrow 231a in FIG. 7A).

When the user desires to decrease the load (or preload) on the torsion springs 188, the user turns the knob 220 in the opposite direction (direction 222b). By pushing the piston 216 away from the exit 239 (i.e. in direction 224b), the first volume 214 is increased, and a portion of the second volume 234 of hydraulic fluid is transferred via the hose 247 to the first volume 214 of hydraulic fluid. The second volume 234 of hydraulic fluid is decreased upon removal of the portion of the second volume 234 of hydraulic fluid. This removal of hydraulic fluid causes the cylindrical tube 236 to move within the cylindrical fixed portion 230. The cylindrical tube 236 (and the cap 238) moves downwardly along the load adjusting axis 250 in direction 258b. By doing so, the second ends 189 of the torsion springs 188 are moved toward the first ends 187 of the torsion springs 188 (illustrated by the arrow 257b in FIGS. 8A and 8B), which in turn decreases the load on the torsion springs 188 and moves the tunnel 108 downwardly (illustrated by arrow 231b in FIG. 8A).

Following the above operations, the user can adjust the load (or preload) on the torsion springs 188 to his/her individual needs.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:
1. A snowmobile comprising:
a chassis including a tunnel, the tunnel having a longitudinal axis;
an engine disposed on the chassis;
an endless drive track disposed at least in part inside the tunnel and operatively connected to the engine for propulsion of the snowmobile;
at least one ski disposed on the frame via a front suspension;
a straddle seat disposed on the tunnel above the endless drive track, the straddle seat being disposed rearward of the engine;

a rear suspension assembly supporting and tensioning the endless drive track, the rear suspension assembly including:
  at least one rail for engagement with the endless drive track;
  at least one suspension arm having an upper end pivotally connected to the tunnel and a lower end pivotally connected to the at least one rail; and
  at least one torsion spring coupled to the at least one suspension arm via a transverse rod, the at least one torsion spring having a first end and a second, the first end applying a force to the at least one rail;
a torsion spring adjuster connected to the at least one suspension arm, the torsion spring adjuster receiving the second end of the at least one torsion spring, the torsion spring adjuster being disposed between the at least one suspension arm and the second end of the at least one torsion spring; and
an actuator operatively connected to the torsion spring adjuster, the actuator being located at least partially outside the tunnel, the actuator operating the torsion spring adjuster to move the second end of the at least one torsion spring relative to the first end of the at least one torsion spring.

2. The snowmobile of claim 1, wherein the torsion spring adjuster is hydraulically operated by the actuator.

3. The snowmobile of claim 2, wherein the actuator includes a first volume of hydraulic fluid, the torsion spring adjuster includes a second volume of the hydraulic fluid, and the first volume is in fluid communication with the second volume.

4. The snowmobile of claim 3, wherein the actuator includes a controller;
  when the controller is in a first position, at least a portion of the first volume of hydraulic fluid is transferred to the second volume of hydraulic fluid; and
  when the controller is in a second position, at least a portion of the second volume of hydraulic fluid is transferred to the first volume of hydraulic fluid.

5. The snowmobile of claim 4, wherein when at least the portion of the first volume of hydraulic fluid is transferred to the second volume of hydraulic fluid, a load on the at least one torsion spring is increased; and
  when at least the portion of the second volume of hydraulic fluid is transferred to the first volume of hydraulic fluid, the load on the at least one torsion spring is decreased.

6. The snowmobile of claim 5, wherein increasing the load on the at least one torsion spring is achieved by moving the second end of the at least one torsion spring away from the first end of the at least one torsion spring; and
  decreasing the load on the at least one torsion spring is achieved by moving the second end of the at least one torsion spring toward the first end of the at least one torsion spring.

7. The snowmobile of claim 4, wherein the controller is a hand-actuable knob.

8. The snowmobile of claim 4, wherein the actuator includes a piston, and the controller is operatively connected to the piston for transferring at least the portion of the first volume of hydraulic fluid to and from the second volume of hydraulic fluid.

9. The snowmobile of claim 8, wherein the controller is a hand-actuable knob, and the controller is operatively connected to the piston via a threaded rod.

10. The snowmobile of claim 1, wherein the torsion spring adjuster includes a fixed portion fixedly connected to the at least second suspension arm, and the torsion spring adjuster includes a movable portion receiving the second end of the at least one torsion spring.

11. The snowmobile of claim 10, wherein the movable portion is movable along a load adjusting axis relative to the fixed portion for adjusting a load on the at least one torsion spring.

12. The snowmobile of claim 11, wherein when the movable portion is moved upwardly along the load adjusting axis, the load on the at least one torsion spring is increased; and
  when the movable portion is moved downwardly along the load adjusting axis, the load on the at least one torsion spring is decreased.

13. The snowmobile of claim 3, wherein the actuator is in fluid communication with the torsion spring adjuster via a hose.

14. The snowmobile of claim 1, wherein the tunnel includes a foot rest, and the actuator is located at least partially on the foot rest.

15. The snowmobile of claim 14, wherein the actuator is located at least partially on a rear part of the foot rest.

16. The snowmobile of claim 1, wherein the at least one torsion spring is a first torsion spring;
  further comprising a second torsion spring disposed adjacent to the first torsion spring, the second torsion spring being coupled to the at least one suspension arm via the transverse rod, the second torsion spring having a first end contacting the at least one rail and a second end; and
  wherein the torsion spring adjuster is operated by the actuator to move the second ends of the first and second torsion springs relative to the respective first ends of the first and second torsion springs.

17. The snowmobile of claim 3, wherein a plate is fixedly connected to the at least one suspension arm, the plate has an aperture, a rim surrounds the aperture, an external surface of the torsion spring adjuster has a flange; and
  the flange rests on the rim of the aperture to secure the torsion spring adjuster to the at least one suspension arm.

18. The snowmobile of claim 17, wherein the second end of the at least one torsion spring biases the torsion spring adjuster toward the plate.

19. The snowmobile of claim 17, wherein the at least one suspension arm has a bend; and
  the plate is fixedly connected to the at least one suspension arm near the bend.

20. The snowmobile of claim 11, wherein the movable portion of the torsion spring adjuster has a rounded surface, and
  the second end of the at least one torsion spring rests on the rounded surface.

* * * * *